US010896237B2

(12) United States Patent
Ananthapur Bache et al.

(10) Patent No.: US 10,896,237 B2
(45) Date of Patent: Jan. 19, 2021

(54) REDUCING DATABASE STRESS USING COGNITIVE DATA CACHING

(71) Applicant: INTERNATIONAL BUSINESS MACHINES CORPORATION, Armonk, NY (US)

(72) Inventors: Vijay Kumar Ananthapur Bache, Bangalore (IN); Jhilam Bera, Bangalore (IN); Vijay Ekambaram, Chennai (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 16/108,267

(22) Filed: Aug. 22, 2018

(65) Prior Publication Data

US 2020/0065424 A1    Feb. 27, 2020

(51) Int. Cl.
 G06F 16/00   (2019.01)
 G06F 16/957   (2019.01)
 G06F 17/18   (2006.01)
 G06N 20/00   (2019.01)
 G06F 16/35   (2019.01)
 G06F 16/9535   (2019.01)
 G06F 16/2455   (2019.01)

(52) U.S. Cl.
 CPC .... *G06F 16/9574* (2019.01); *G06F 16/24552* (2019.01); *G06F 16/355* (2019.01); *G06F 16/9535* (2019.01); *G06F 17/18* (2013.01); *G06N 20/00* (2019.01)

(58) Field of Classification Search
 None
 See application file for complete search history.

(56) References Cited

U.S. PATENT DOCUMENTS

| | | | |
|---|---|---|---|
| 7,020,750 | B2 | 3/2006 | Thiyagaranjan et al. |
| 8,874,687 | B2 | 10/2014 | Gupta et al. |
| 2006/0129766 | A1 | 6/2006 | Cassia et al. |
| 2013/0198258 | A1 | 8/2013 | Decusatis et al. |
| 2015/0012468 | A1* | 1/2015 | Kegel ............... H04N 21/44204 706/12 |

(Continued)

OTHER PUBLICATIONS

Peter Mell et al, The NIST Definition of Cloud Computing, National Institute of Standards and Technology, Publication 800-145, 2011, entire document.

(Continued)

*Primary Examiner* — Anhtai V Tran
(74) *Attorney, Agent, or Firm* — Patrick J. Daugherty; Daugherty & Del Zoppo Co., LPA (57) ABSTRACT

Aspects of the present invention provide devices that filter a subset of items from a database according to a model which predicts sales of items in the database with social media data and the subset of items filtered according to a highest predicted sales. The model comprises a machine learning model trained with sales history of items from the database and social media data history. The devices load the filtered subset of items from the database into a data cache, receive a search which searches for one or more items in the database, and return one or more items of the loaded subset of items from the data cache in response to the received search.

17 Claims, 5 Drawing Sheets

(56) References Cited

U.S. PATENT DOCUMENTS

2017/0109807 A1* 4/2017 Krishnan ............ G06Q 30/0253

OTHER PUBLICATIONS

Daniel A. Jimenez et al, Neural Methods for Dynamic Branch Prediction, ACM Transactions on Computer Systems, vol. 20, No. 4, 2002, entire document.

Aamer Jaleel et al, High Performance Cache Replacement Using Re-Reference Interval Prediction (PRIP), ACM, 2010, entire document.

William M. Campbell et al, Social Network Analysis with Content and Graphics, Lincoln Laboratory Journal, vol. 20, No. 1, 2013, entire document.

Thomas Bohn et al, Implementation of a database-based cache pattern in WebSphere Enterprise Service Bus, 2013, translation provided, entire document.

AWS Documentation, Dynamic Scaling for Amazon EC2 Auto Scaling, http://aws.amazon.com/documentation, Amazon Web Services, Inc., 2018, entire document.

* cited by examiner

REDUCING DATABASE STRESS USING COGNITIVE DATA CACHING

BACKGROUND

The field of electronic data management includes database access, searching and caching of data.

Database management systems and/or middleware use caching of data for improved performed in searches for data, such as in the data content used in web pages delivered by a web server or hypertext transfer protocol (HTTP) server. Caching is the holding of selected portions of the data stored in the database in an electronic memory readily accessible by a processor responding to a search request rather than incurring the time to retrieve data from electronic storage. Retrieving from electronic storage can include communication between servers, such as from a web server to a database server, across a network between servers, retrieval from slower speed electronic memory, access to disk drives, combinations thereof, and the like. The selected portions of the data stored in the cache are referenced by an element or a key, which is a tag or pointer into the specific data items referenced by the search request.

As the cache fills, selected items in the electronic memory are replaced according to data retrieved for newer searches. Caches can improve performance by reducing accesses to electronic storage when data is reused between searches and the data is held in the cache, rather than retrieved from electronic storage each time.

BRIEF SUMMARY

In one aspect of the present invention, a computer-implemented method for reducing database stress using data caching includes executing on a computer processor filtering a subset of items from a database according to a model which predicts sales of items in the database with social media data and the subset of items filtered according to a highest predicted sales. The model comprises a machine learning model trained with sales history of items from the database and social media data history. The computer processor loads the filtered subset of items from the database into a data cache, receives a search which searches for one or more items in the database, and returns one or more items of the loaded subset of items from the data cache in response to the received search.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby reduces database stress using data caching, which filters a subset of items from a database according to a model which predicts sales of items in the database with social media data and the subset of items filtered according to a highest predicted sales. The model comprises a machine learning model trained with sales history of items from the database and social media data history. The processor loads the filtered subset of items from the database into a cache, receives a search which searches for one or more items in the database, and returns one or more items of the loaded subset of items from the data cache in response to the received search.

In another aspect, a computer program product for reducing database stress using data caching has a computer-readable storage medium with computer readable program code embodied therewith. The computer readable hardware medium is not a transitory signal per se. The computer readable program code includes instructions for execution by a processor that cause the processor to filter a subset of items from a database according to a model which predicts sales of items in the database with social media data and the subset of items filtered according to a highest predicted sales. The model comprises a machine learning model trained with sales history of items from the database and social media data history. The processor loads the filtered subset of items from the database into a cache, receives a search which searches for one or more items in the database, and returns one or more items of the loaded subset of items from the data cache in response to the received search.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
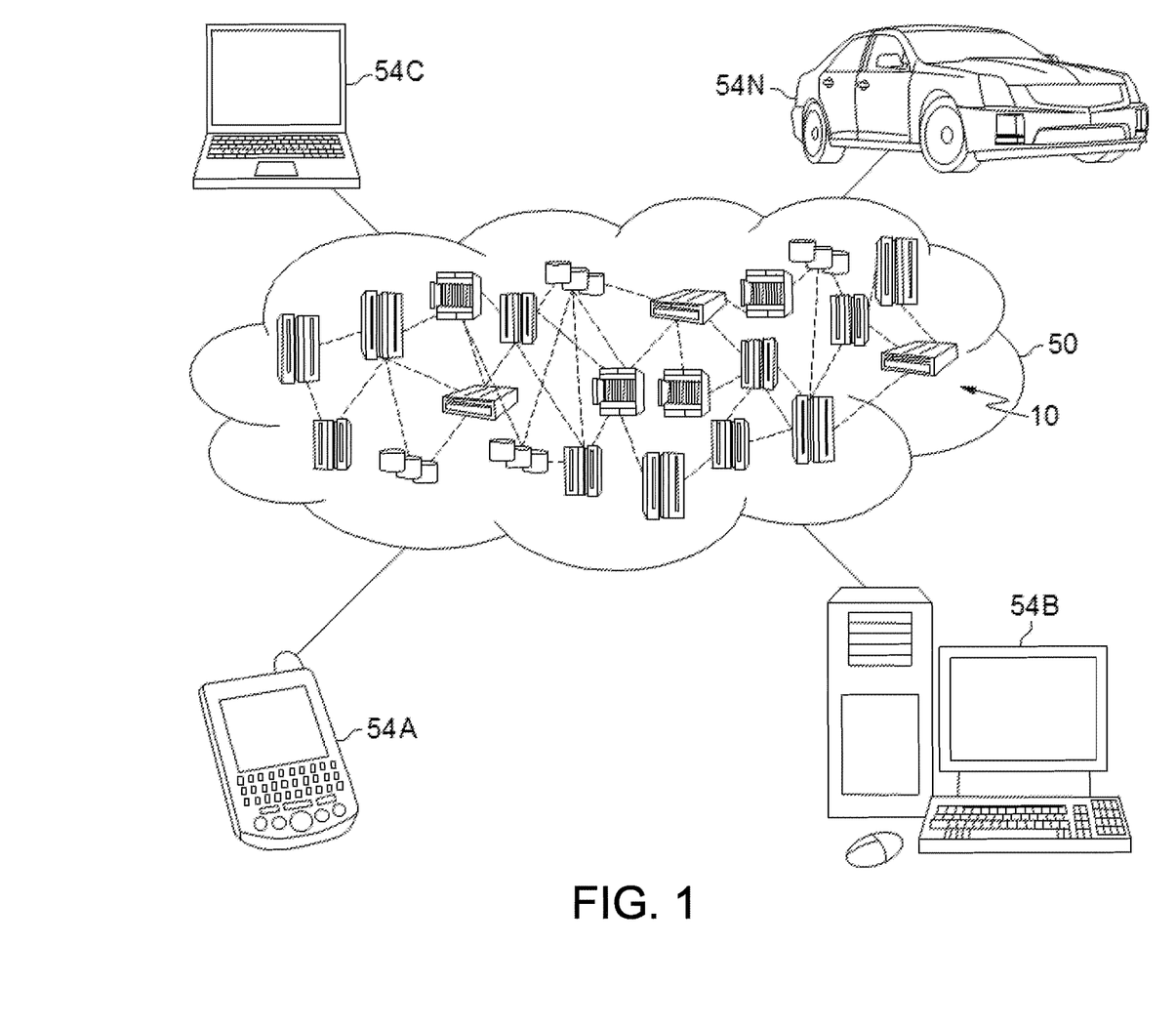
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
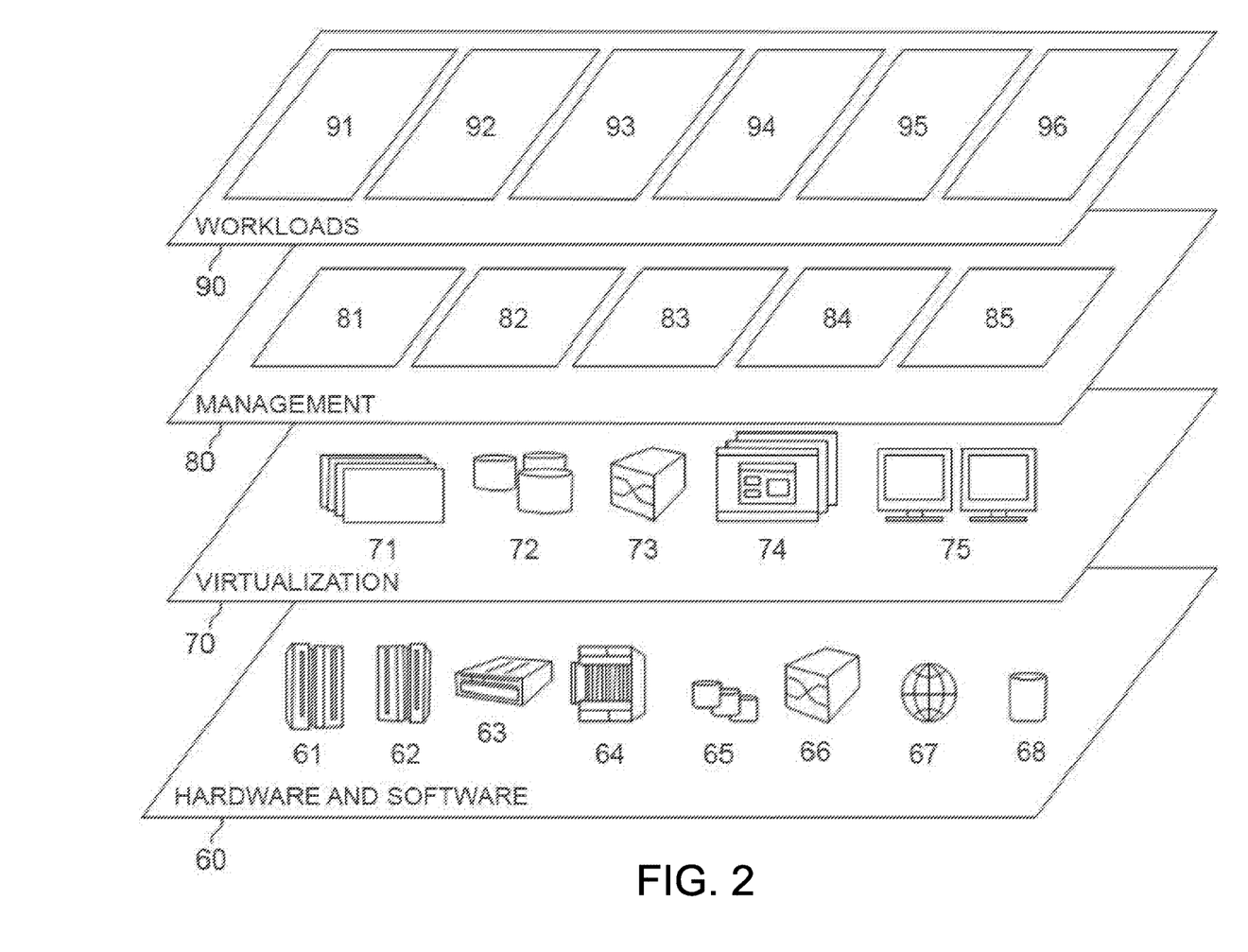
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for reducing database stress using data caching 96.

Figure 3:
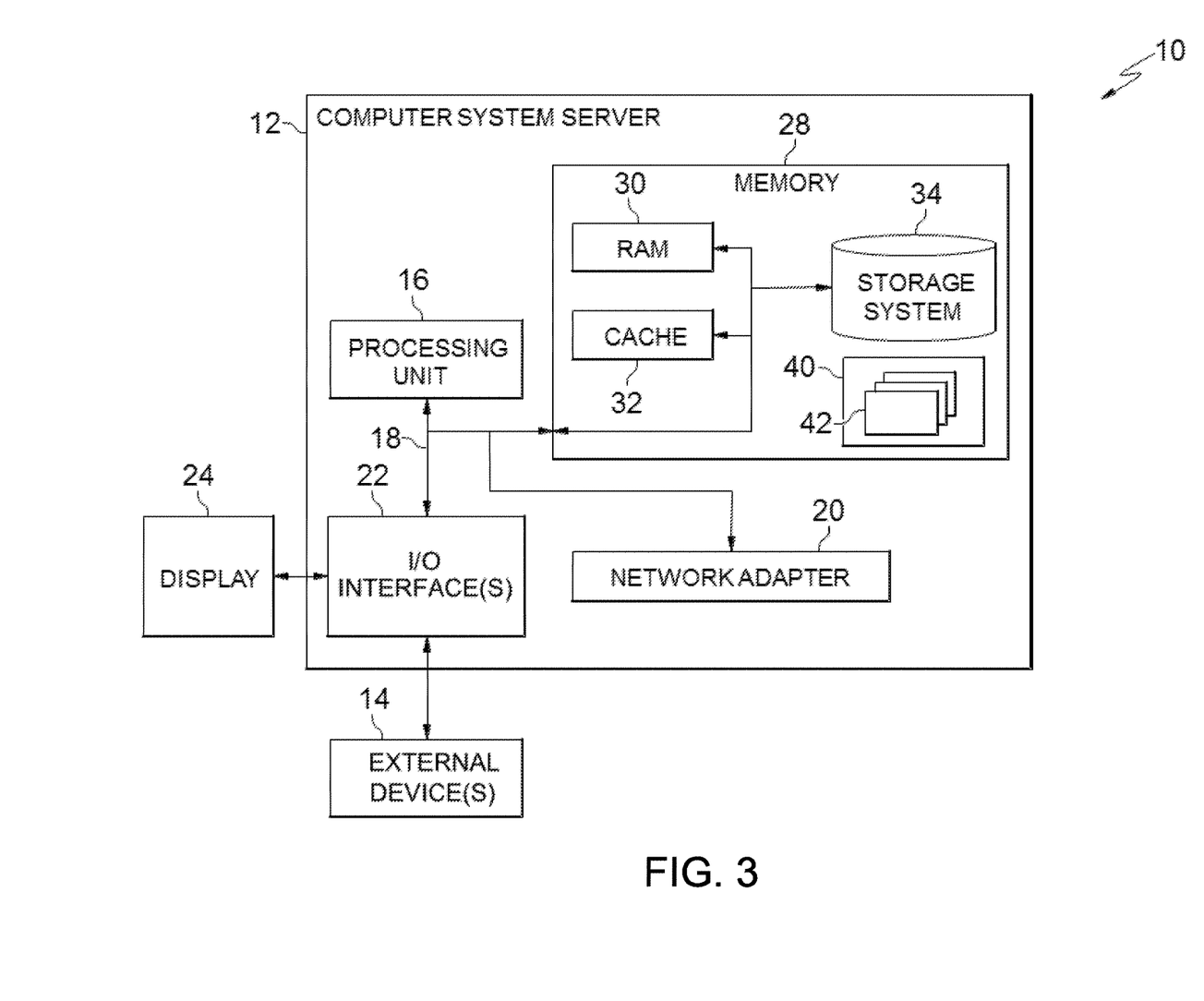
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
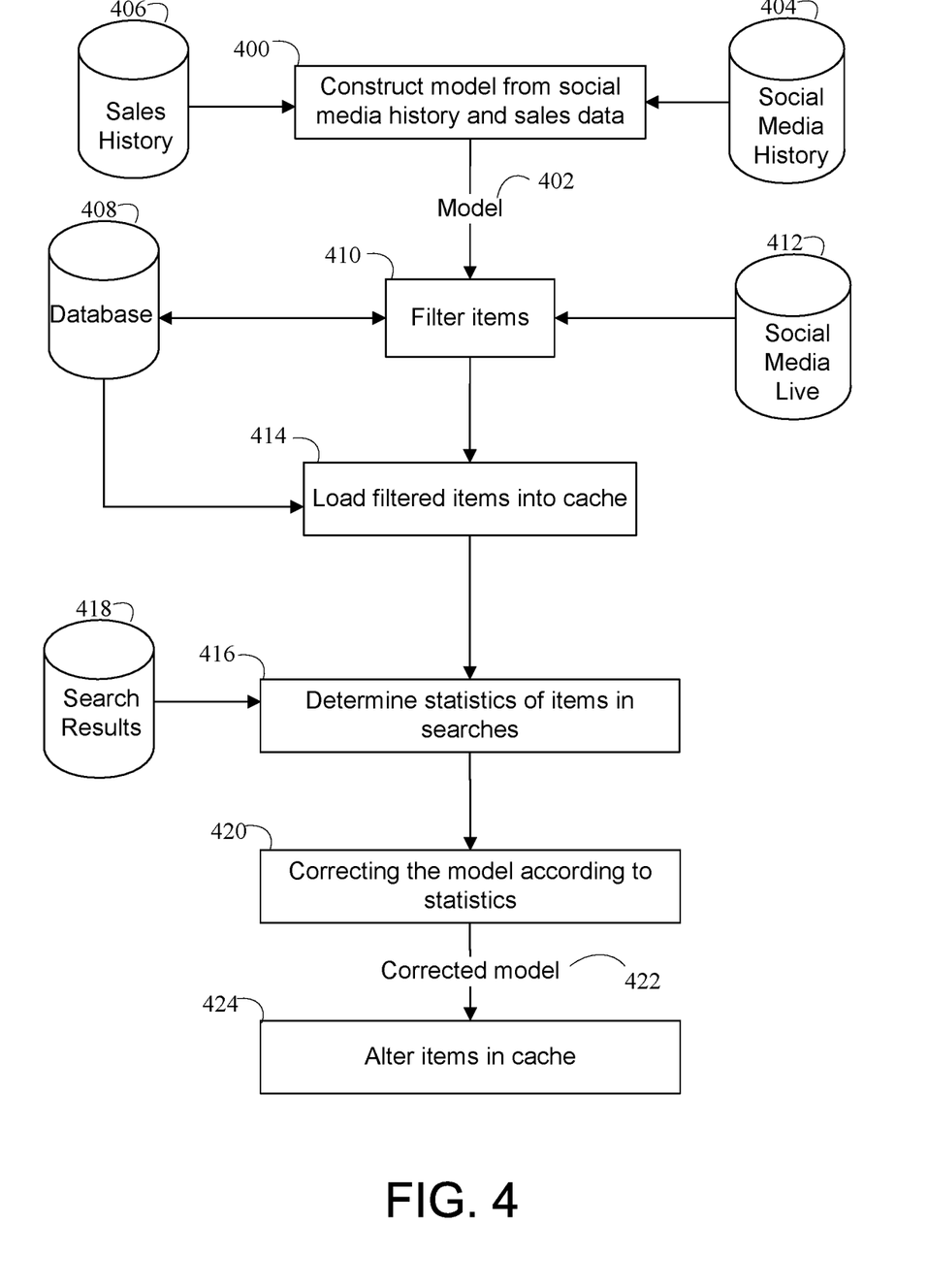
FIG. 4 is a flow chart illustration of an embodiment of the present invention.

FIG. 4 illustrates one embodiment of a method according to the present invention for data caching. At 400, a processor that is configured according to an aspect of the present invention (the "configured processor") trains a machine learning model 402 using social media history 404 to classify/predict sales of goods from sales history 406. The model 402 is trained to predict sales of items based on the social media history 404. The machine learning model 402 can include a neural network, linear regression model, support vector machines, long short term memories (LSTMs), decision trees, recurrent networks, and combinations thereof. For example, an increase of social media discussions of rainy weather forecasts correlate with increases in purchases of an umbrella, and the trained model learns the relationship between the social media weather discussions and the umbrella purchases.

A statistical learning technique of the machine learning model 402, which can include classifying words, phrases, and patterns of words and phrases, can acquire large amounts of unstructured or unprocessed data over a time interval, and information about application programming interface (API) calls, which is relevant data of search requests to the database over time by users. The technique can include pattern recognition of events on social media to suggest to middleware about current trends. The machine learning model 402 can identify certain patterns of events and identify relevant information, such as predicted sales, which can be a proxy or filter for search requests.

For example, in the instance in an international athletic event, people have favorite teams, and a product based entity can receive requests that are related to the international athletic event. A large user population searching for a limited number of products can introduce performance concerns. That is, a node servicing the database can become overwhelmed and slow. Each search request is for a subset of M items out of N items in the database, and each search needs to keep the ratio small to avoid extra accesses to the database. The model 402 receives the social media data which is data about external stimulating events. In some instances, the external stimulating events lead to increase in sales, and corresponding an increase in search requests. The model 402 provides a cognitive solution that identifies and classifies prior information about an external stimulating event, such as the international athletic event.

The social media history 404 includes historical data feeds from social media sites, such as FACEBOOK®, TWITTER®, SNAPCHAT®, blogs, and the like. FACEBOOK is a registered trademark of Facebook, Inc. in the United States or other countries. TWITTER is a registered trademark of Twitter, Inc. in the United States or other countries. SNAPCHAT a registered trademark of Snap Inc. in the United States or other countries. The social media history 404 includes discussion feeds. In some embodiments, the social media history 404 includes discussion feeds and demographic data, such as age, location, etc., of an author or source corresponding to the discussion feeds.

The sales history 406 includes sales data for goods, services, and combinations thereof. The sales history includes quantities according to time, such as a number of the umbrellas sold by hour, day, week, month, etc. The sales history can include sale demographics, such as customer age, customer income, customer total purchase, sale locations, and the like. The goods or services are represented by items stored in a database 408. Items stored in the database 408 can include elements of a relational table, such as rows in relational database access using structured query language (SQL), or documents, such as in non-relational database access of a JavaScript object notation (JSON) formatted object using non-SQL or NoSQL. For example, an umbrella is a good for sale by an entity, and is represented by an item formatted as a JSON object, such as {"Id":1, "name;" "An umbrella," "price:" 12.50}. The item can be accessed by one or more elements in the object or document such as the "Id," the "name," the "price," and combinations thereof.

The sales history 406 and the social media history 404 include similar time periods or include groupings to form similar time periods. For example, umbrella sales in one geographic region predominately occur in three-month period. The sales history 406 for umbrellas includes the three-month period and the social media history includes a same corresponding period. The corresponding periods can include the same period, an overlap, such as the social media history 404 preceding the sales history 406, and combinations thereof. The periods, for example, such as discussion data by transaction or posting, can be grouped to hourly, daily, weekly, etc. In some embodiments, the corresponding periods include an event cycle, such as an annual holiday season, or other repeating event, for example, an athletic championship, a weather event, an awards ceremony, etc. The configured processor may be implemented in accordance with the computer system server 12 of FIG. 3, including as the cloud node 10 of FIG. 1, as described respectively above.

At 410, the configured processor predicts sales for items from the database 408 according to the trained model 402 and current data from social media 412 and filters the items according to the predicted sales. The current data from the social media 412 is received as supplied by the social media, which can be by transaction. The trained model 402 predicts items that will be requested in searches based on the learned relationship between the social media history 404 and the sales history 406, and the relationship between sales and requested items in a searches. For example, an online retailer sells athletic equipment, and customers search for items to purchase one or more items, which in some instances is indicative of the relationship between sales and requests for the item in search. Social media discussions about athletics or athletic equipment often motivate potential customers to go online and purchase equipment, which, in some instances is indicative of the relationship between social media and sales. The configured processor filters the items from the database 408 based on predicted sales. For example, the database contains approximately 10,000 items for sale, and the configured processor weights each item according to a number of expected sales of the item within an interval, such as a minute, an hour, a day, a week, etc. The configured processor filters the 10,000 according the weight and filters those items above a predetermined threshold. The predetermined threshold can be determined based on, for example, a size of the cache.

For example, an airline ticketing entity has x number of airlines, and each airline has y flights each day in a predetermined window oft days. During an event, people are searching for flights from location A to B. The total search requests during the predetermined window will be the product of x, y, and t, (x*y*t). A conventional approach of pagination, where $x_1$ are the pages of airlines retrieved due to pagination, and $y_1$ the number of pages of flights retrieved due to pagination, the total search requests is $x_1*y_1*t$. As the ratio, $x*y*t/x_1*y_1*t$ becomes small, performance suffers, such as a large number of airlines/flights widely dispersed across pages, or large sizes of data for each airline/flight. The model 402 uses patterns recognition/classification based on social events, trends, calendars, and sales patterns to identify and filter a subset of items in the database 408. The subset can be filtered from items in the database with a highest predicted sales. The predicted sales can be normalized to a frequency of sales. The model 402 can include a relative probability that an item is more likely to be purchased that another. In some embodiments, the prediction is expressed as a relative probability, such as product A is more likely to be purchased than product B. The relative probability can be expressed according to an interval of time, such as minute, hour, day, etc.

At 414, the configured processor loads the filtered items from the database 408 into the cache. The loading includes the reading of items stored in electronic storage. The loading of the filtered items from the database 408 into the cache, can provide the ability to pre-populate the cache instead of the conventional practice, which is only in response to a search and at a time of demand. Pre-populating the selected items into the cache improves performance of some searches, which retrieve one or more of the selected items from cache rather than accessing the database 408.

At 416, the configured processor returns one or more items in the cache in response to searches for items from the database 408. The trained model 402 predicts the items to be selected based on the social media 412, which in some instances provides a forecast of expected demand, and provides a performance improvement because the item is already present in the cache rather than having to load from electronic storage. The items in cache can be weighted according to a probability assigned by the trained model 402 as part of the classification.

At 418, the configured processor determines statistics of items requested from the searches. For example, the configured processor can compute statistics of a last N prior searches, where N is a positive integer, or compute statistics of a predetermined interval, such as every M minutes, every M hours, every M days, and the like, where M is a positive integer. The statistics can include a frequency of the item occurring in a search with the interval, a time between requests for the item within the interval, a function of the frequency, a function of the time, and combinations thereof. The statistics can include descriptive statistics, such as measures of central tendency and distribution. That is, the measures can include a mean, median, variance, standard deviation, mode, skew, kurtosis, etc. In some embodiments, the change in weighting can be based on trends in the statistics. For example, a regression analysis indicates an upward trend in social media for blue mousses, and a downward trend for yellow mousses. The change in weighting can include a predictive change in more demand for blue mousses exceeding yellow mousses.

At 420, the configured processor corrects the trained model 402 according to the statistics, which produces a corrected model 422. For example, the statistics can be used to adjust the probability of a classifier in the neural network, which classifies an item based on the live social media 412. For example, the corrected model 422 based on the trends above increases a probability for the document representing the blue mousses and decreases the probability for the document representing the yellow mousses.

At 424, the configured processor alters the items in the cache according the corrected model 422. For example, the corrected model 422 selects a different set of items from the database 408, which replaces one or more items in the data cache. The altering of items is in response to both actual search requests and the live social media 412. For example, the live social media suggests greater demand for blue computer mice than yellow computer mice. However, statistics that correct the trained model 402 indicate that yellow computer mice are in greater demand according to search requests. The configured processor based on the prediction of the corrected model 422 changes the set of items from a document representing a blue computer mouse to a yellow computer mouse, and alters the cache to include the document for yellow computer mouse replacing the document of blue computer mouse.

The altering of cache considers both the internal processing of search requests, and the influence of external events, such as reflected in the live social media 412, which provides performance improvements over conventional data caching, which does not consider external events. For example, during an athletic event, a team wins, and social media discusses the win, and corresponding demand for products worn by winning team increases, which can be reflected in the choice of items selected for the cache. In some instances, the correction applies, because the search results can differ from product sales.

The configured processor can repeat acts 416, 420, and 424 in a periodic manner or in response to a command to update the cache.

Figure 5:
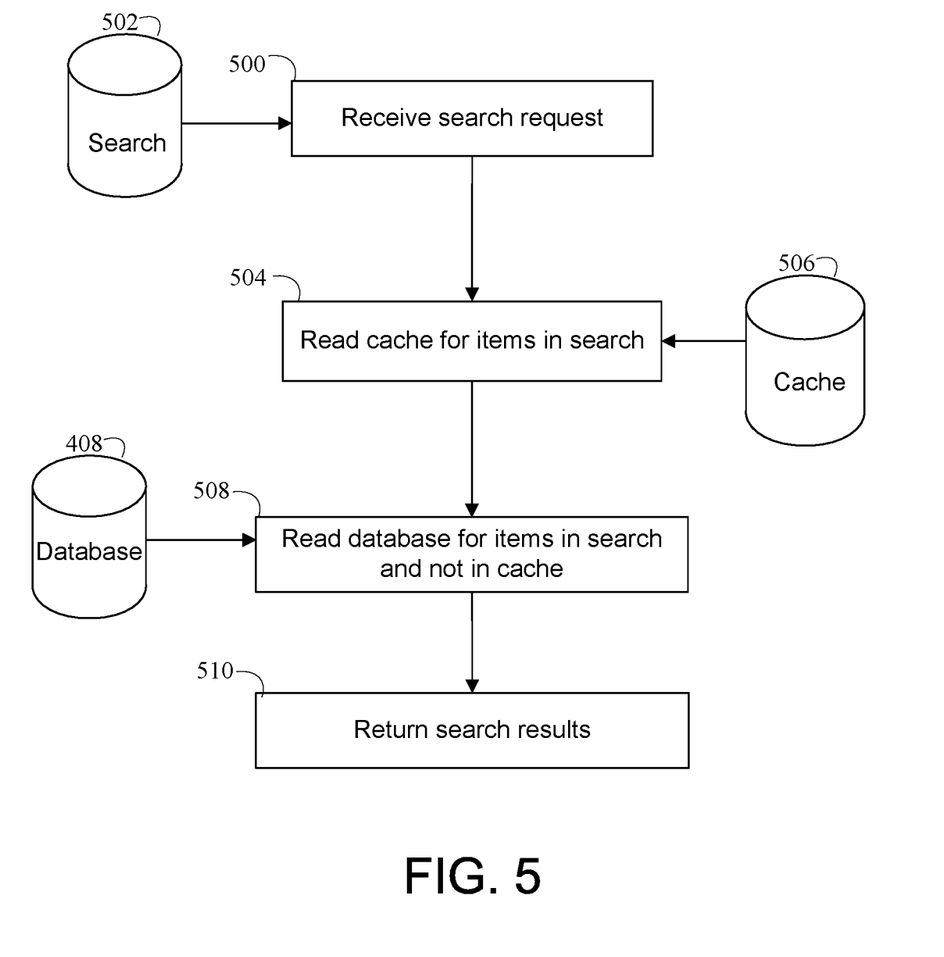
FIG. 5 is a flow chart illustration of another embodiment of the present invention.

FIG. 5 illustrates one embodiment of a method according to the present invention for data. At 500, the configured processor receives a search request 502, which requests items stored in the database 408. In some instances, the search request 502 can be received from a web server, such as a hypertext transfer protocol (HTTP) server that advertises or offers for online purchase, products, services or combinations thereof. The search request includes a set of items to be requested from the database 408.

At 504, the configured processor reads the cache 506 for items from the received search request 502, and the cache 506 includes items filtered from the database 408 according to the trained model 402 or the corrected model 422, and loaded into the cache 506. The present invention provides improvement to the functioning of a computer that is executing trained modeling. The trained model 402/corrected model 422, in some instances, can provide performance improvements over conventional practice because the cache 506 includes items predicted based on social media. Conventional practice relies on items loaded to cache only in response to a search request, and does not consider effects of external factors on search requests or predictive loading of the cache. The cache 506 can be pre-loaded according to the trained model 402, or updated according to the statistics of prior searches according to the corrected model 422. All computing systems have a limited quantity of computing resource including, but is not limited to, bus bandwidth, network bandwidth, cache size, central processor unit cycles, and electrical power. As such, the consumption of those resources above a threshold negatively impacts the ability of the computer system to process additional requests. By pre-loading cache 506 according to the trained model 402, or updating cache 506 according to the statistics of prior searches according to the corrected model 422 a larger portion of entries in cache 506 are statistically likely to correspond to data that matches a search, which reduces the consumption of computer resources that would otherwise be required to retrieve that data over time and yield an increase in the number of requests that can be processed in that time period. As such, the present invention encompasses an improvement to at least the field of computer systems.

Database stress is a decrease in throughput of servicing search requests above a threshold, an increase in response time to process search requests above a threshold, a denial of service, or combinations thereof. It is understood that a given computing system includes a limited amount of computing resources for servicing search requests and is configured to consume those computing resources such that the computing system operates within a range of throughput of servicing search requests, and to return search results within a range of response times, which are considered to constitute an acceptable level of performance for servicing search requests for that computing system. It is further understood that thresholds can be used to determine when the computing system is experiencing database stress such that the computing system is (i) no longer within the range of throughput of servicing search requests, and (ii) returns search results outside of the range of response times. One example of a computing resource that is consumed during servicing search requests is threads. Using a simplified example, a database Y, conventionally configured, includes a maximum of 100 threads that can be used to concurrently process search requests. Each thread uses and consumes additional computing resources, such as portions of a processing unit, memory, I/O interfaces, and combinations thereof to process one search request from start to finish. In this example, each service request to database Y includes one item, and a time to service each service request averages 1.0 seconds. In the first 10 seconds following an event, 1200 initial requests are received for items in the Y database that includes 12,000 items. Conventionally, configured database Y processes 100 search requests each second, or 1000 requests in 10 seconds, averaging 100 requests/second throughput with an overall response time averaging 1.0 seconds. Overall, the database Y processes 1000 requests and returns a denial of service, such as a transaction timeout for the remaining 200 requests due to unavailable resources, which is presented as "try your request again later." In this example, the cache for conventionally configured database Y is not pre-loaded and each initial request results in an actual database search and the database Y is determined to be stressed because the database cannot process all the requests, resulting in the denial of service for 200 search requests. In some embodiments, in response to a determination that a database, such as database Y, has at least a threshold amount of stress, for example is below a minimum throughput for a time period, items are pre-loaded into a cache, such as cache 506, since such pre-loading is predicted to (i) reduce the stress on the database and (ii) result in a decrease in the consumption of a given computing resource. In another example and embodiment, (i) a prediction is made as to whether pre-loading items into cache will yield an overall savings in computer resource consumption and (ii) if so, then the computing system leverages the pre-loading of items into the cache to bring about the overall savings in computer resource consumption.

With the cache 506 added to database Y, the configured processor filters 400 items from the database Y, which are pre-loaded into the cache 506. The selection of the filtered 400 items pre-loaded is based on predicted sales. A time to service each item in the cache 506 is uniformly 0.1 seconds. Thus, for database Y using the 400 pre-loaded items of the 1200 items and a uniform distribution, database Y processes 80 searched items each second from the database Y using 80 threads and 40 searched items each second from the cache 506 using 4 threads (10 searched items each second) for a total of 84 threads. The database Y, with the cache 506 pre-loaded with the 400 items, processes all 1200 search items in the 10 seconds. The throughput is increased over conventional practice from 1000 to 1200 in 10 seconds, or from 100 requests per second to 120 requests per second. The response time decreases from an average of 1.0 seconds to 0.84 seconds. A high water mark of threads at 84 provides 16 additional threads for processing more search requests. The database Y is not stressed as additional processing can be performed with the 16 additional threads. There is no denial of service. Throughput is increased 20 percent, and response time is decreased 16 percent. As such, it is recognized that an improvement to the functioning of the computing system has been made since there is an increase in search request throughput and a decrease in response time for servicing search requests without a corresponding increase in a given computing resource that is dedicated to servicing those search requests.

In the prior example, one third of the actually requested items are pre-loaded into the cache 506. In another example, the cache 506 includes one half of the actually requested items preloaded into the cache 506. Thus, with the pre-loaded cache 506 and correctly predicted fifty percent of the items requested, database Y processes 60 searched items each second from the database Y using 60 threads and 60 searched items each second from the cache 506 using 6 threads (10 searched items each second) for a total of 66 threads. In this example, the denial of service is avoided and the resource availability in the number of threads over the prior example increases 100 percent. Resource consumption of threads is reduced when compared to conventional practice by more than 33%, i.e. from 100 threads to 66 threads.

Throughput, response time, and denial of service can be measured by the database directly or by performance monitoring techniques.

In some instances, the corrected model 422 can correct for error in the trained model 402, which represents the differences between predicted sales and search requests. For example, in the pre-loaded cache 506, a set of items includes predicted items with weights or probabilities in a range of 0.80-.0.97. Item B included in the set of items with a weight of 0.80, and excludes item X with a weight of 0.79. That is, a search request for item B is satisfied from the cache 506 while a search request for item X is not satisfied from the cache 506 and includes a database access. In some instances, this indicates that item B is more likely suggested by the social media 412 for the predicted sale than item X. The corrected model 422 includes statistics of actual search requests. For example, a number of requests for item B in a 5 second interval include (10, 20, 30, 30, 20) and requests for item X include the 5 second interval include (5, 15, 30, 40, 60). The statistics indicate a flat or declining trend for item B with a statistical average of 20 while item X including an increasing trend with a statistical average of 30. The corrected model 422 corrects or adjusts the probability of item B to 0.78 and the probability of item X to 0.81 based on the statistics. The configured processor based on the corrected weight adjusts the filtering to replace item B in the cache 506 with item X.

The corrected model 422 continues to process the social media 412 with the cache 506. For example, conventionally, a set of 200 popularly requested items is included in a conventional paginated cache based on prior search requests, which is adjusted based on page frequency over an interval, such as 15 minutes. A media event occurs, which includes an announcement of upgraded devices represented in the set of 200 items, subsequently discussed on social media. A spike of search requests now pertains to a new set of 200 search requests for the upgraded items. Conventionally, the paginated cache fails to service the new set of 200 items from the cache until the number of search requests for the new search requests based on pagination exceeds the prior interval with the previous set of 200 items. That is, with a 0.1 access time using the cache and a 1.0 access time using the database, the average access time for 200 items prior to the announcement is 0.1 seconds and the average post announcement for the new items is 1.0 seconds, a ten fold increase in response time as potential new sales represented as search requests for the upgraded items. Database stress occurs based on resource constraints. As the average response time increases, throughput based on resource constraints, such as number of threads, number of cores, etc., can decrease. For example, a maximum threads of 100 no longer services thousands of requests because each thread previously serviced 10 requests/second and now only services 1 request per second, which is a tenfold decrease in throughput. In some instances, conventional approaches lag changes in the database cache caused by external events and stress the database.

With the corrected model 422 continuing to process data feeds from the social media 422, the predicted sales for the first set of items decreases and predicted sales for the new set of items increases. This decreases the probability of items in the pre-announcement set of items and increases the probability of items in the post-announcement set of items. The configured processor, based on the probabilities assigned by the corrected model 422 adjusts the filter to replace items in the cache 506, which reflected the external announcement event of the upgraded items. As the discussions on social media 412 change to reflect the new items, the corrected model 422 adjusts the probabilities of the items, which in turn causes the configured processor to alter a composition of the cache 506. In some instances, the trained model 402 or the corrected model 422 lead or track changes to the cache 506 caused by external events predictive of sales, such as social media discussions.

At 508, the configured processor can request items from the database 408, which are absent from the cache 506 to complete a set of items included in the search request 502. If all items are present in the cache 506 that satisfy the search request 502, then the request to the database 408 is omitted.

At 510, the configured processor returns the set of items according to the search request 502. In some embodiments, the configured processor updates the statistics of searches according to the search results.

Storing items in the data cache includes a set of M items from the database 408 of N items, where M and N are integers, and M is very small with respect to M, M<<N. With the search request passed from the API to the middleware, the middleware determines if the set of items S from the search request are present in the data cache. The set of items, M, in the data cache are selected or filtered from the database 408 based on the cognitive solution of the model 402, 420. The set of M items can be stored in a data set or file with a temporary identifier, while the database 408 includes a data set or file with a permanent identifier. While loading the items into the data set with a temporary, accesses to the database 408 continue. At a time of activation, the model 402, 420 is called by the API, which connects with the temporary data set or file. The middleware reroutes the API call from the database 408 to the model 402, 420, which accesses the data cache. Using this technique, a search request does not search the database 408 of N items, rather the cache of M items, where M<<N. The response time improves for on demand items.

A conventional approach to selecting and holding data in a cache is based on a user requesting the search for items. For example, data items retrieved in response to a first search request by a platinum customer is held in the cache and subsequent queries utilize the items held in cache, while data requested by non-platinum customers are retrieved each time from electronic storage. Cache replacement algorithms, such as first-in first out (FIFO), last in first out (LIFO), least recently used (LRU) are used as the cache fills to determine which items are replaced by retrieved newer items from newer searches.

As the size of databases or items in the database grow larger, such as in big data or more data in each document, the cache fills with fewer items relative to the database, and more access is made to the electronic storage, which increases the search times correspondingly.

A database that has increasing amount of information needs a special database architecture that can satisfy a maximum amount of user requests at any time. Database search time is directly proportional to the amount of information stored in the database. After designing the architecture of a database, modifications according to user needs can be cost prohibitive and not worth the effort. A consideration for the database architecture includes changes for certain user interactions over time. Many stimulating events in media, business, latest trends, economy, etc., can impact on applications which search the database. External events, such as indicated in big data, generate highly unstructured data, which makes architecture changes non-feasible. According to user requirements, a database can include various tables, or identifiers. For example, a product based application includes various categories of products and includes identifiers or tables for the products and product categories. A conventional approach to increasing performance is to include a pagination technique. However, if the application includes a large number of items in a same product category, then in some instances pagination fails. In order to provide a good user experience in terms of performance, external unstructured data or big data needs to be processed and the cache correspondingly modified.

With a dynamically changing application programming interface (API), the architecture with the model 402, 420 provides efficiencies in handling large numbers of search requests. The architecture with the model 402, 420 adapts to filter the social media and prior search request and modify the model 420 according to user needs. During a particular external event, such as a holiday, people like to buy items that are related to that holiday. A database that includes such holiday products can face a stressful number of search requests. For example, an event can cause a large number of search requests over an immediate prior time interval, which stress the database in response time, in throughput, in denial of service, and combinations thereof. For example, a holiday product is shown in an online performance event, which is included as an item in a database normally receiving 100 requests/second, which after the online performance now receives 10,000 requests/second for the item, which is orders of magnitude larger than the previous request rate. If the item is present in the cache then requests may be serviced according to the resource allocation of the cache, such as high speed memory, rather than the resource allocation to the database, such as access of electronic storage. In this approach, which uses cognitive learning and pattern recognition, automated modification of the access to the database through the model 402, 420, can be achieved by reducing the access to the database with accesses to the cache. Similarly, with this approach, a high number of search requests can be faster.

The model 402, 420 provides a solution based on a cognitive approach, which identifies a latest trend, sales patter, events from a calendar, etc., and suggests items to store in the cache for optimization of time to satisfy search requests. The model 402, 420 modifies the data cache using predictions based on unstructured data. Loading data into the cache can be performed before users search for items, which means that items can be loaded into the cache without user interaction, which avoids the performance problems with traditional cache methods that load a cache only in response to a search request. The model 402, 420 can operate continuously to update the cache for the most likely requested items based on predicted sales and corrected for searches. The model 402, 420 continuously adjusts to new social media data while correcting using statistical information based on actual searches.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reducing database stress using data caching, comprising executing on a computer processor:
   filtering a subset of items from a database according to a model which predicts sales of items in the database with social media data and the subset of items filtered according to a highest predicted sales, wherein the social media data comprises discussion data, wherein the model comprises a machine learning model trained with sales history of items from the database and social media data history, and wherein the model classifies words or phrases present in the discussion data according to a quantity sold of items represented in the sales history for a like time interval;
   loading the filtered subset of items from the database into a data cache;
   receiving a search which searches for one or more items in the database; and
   returning one or more items of the loaded subset of items from the data cache in response to the received search.

2. The method of claim 1, further including:
   determining statistics of items included in a plurality of prior searches of the database;
   correcting the model according to the determined statistics of the items included in the plurality of prior searches of the database; and
   altering the loaded subset of items filtered from the database and loaded into the cache according the corrected model.

3. The method of claim 1, further comprising:
   training the machine learning model which comprises constructing a neural network that classifies discussion data from the social media history according to sales of goods represented by the items stored in the sales history and in the database.

4. The method of claim 1, wherein the search comprises a data request received from a web server that generates a web page with at least one item of the subset of items.

5. The method of claim 1, wherein the subset of items loaded include at least one cache object selected from a row in a relational database and a document in a non-relational database.

6. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer readable storage medium via the computer readable memory and thereby performs the filtering the subset of items from the database according to the model, the loading of the filtered subset of items from the database into the data cache, the receiving the search which searches for the one or more of the items in the database, and the returning the one or more of the items of the loaded subset of items from the data cache in response to the received search.

7. The method of claim 6, wherein the computer-readable program code is provided as a service in a cloud environment.

8. A system for reducing database stress using data caching, comprising:
   a processor;
   a computer readable memory in circuit communication with the processor; and
   a computer readable storage medium in circuit communication with the processor;
   wherein the processor executes program instructions stored on the computer readable storage medium via the computer readable memory and thereby:
   filters a subset of items from a database according to a model which predicts sales of items in the database with social media data and the subset of items filtered according to a highest predicted sales, wherein the social media data comprises discussion data, wherein the model comprises a machine learning model trained with sales history of items from the database and social media data history, and wherein the model classifies words or phrases present in the discussion data according to a quantity sold of items represented in the sales history for a like time interval;
   loads the filtered subset of items from the database into a data cache;
   receives a search which searches for one or more items in the database; and
   returns one or more items of the loaded subset of items from the data cache in response to the received search.

9. The system of claim 8, wherein the processor executes program instructions stored on the computer readable storage medium via the computer readable memory and thereby:
   determines statistics of items included in a plurality of prior searches of the database;
   corrects the model according to the determined statistics of the items included in the plurality of prior searches of the database; and
   alters the loaded subset of items filtered from the database and loaded into the cache according to the corrected model.

10. The system of claim 8, wherein the processor executes program instructions stored on the computer readable storage medium via the computer readable memory and thereby:
    trains the machine learning model which constructs a neural network that classifies discussion data from the social media history according to sales of goods represented by the items stored in the sales history and in the database.

11. The system of claim 8, wherein the search comprises a data request received from a web server that generates a web page with at least one item of the subset of items.

12. The system of claim 8, wherein the subset of items are represented in at least one cache object selected from a row in a relational database and a document in a non-relational database.

13. A computer program product for reducing database stress using data caching, the computer program product comprising:
a computer readable storage medium having computer readable program code embodied therewith, wherein the computer readable storage medium is not a transitory signal per se, the computer readable program code comprising instructions for execution by a processor that causes the processor to:
filter a subset of items from a database according to a model which predicts sales of items in the database with social media data and the subset of items filtered according to a highest predicted sales, wherein the social media data comprises discussion data, wherein the model comprises a machine learning model trained with sales history of items from the database and social media data history, and wherein the model classifies words or phrases present in the discussion data according to a quantity sold of items represented in the sales history for a like time interval;
load the filtered subset of items from the database into a data cache;
receive a search which searches for one or more items in the database; and
return one or more items of the loaded subset of items from the data cache in response to the received search.

14. The computer program product of claim 13, wherein the instructions for execution cause the processor to:
determine statistics of items included in a plurality of prior searches of the database;
correct the trained model according to the determined statistics of the items included in the plurality of prior searches of the database; and
alter the loaded subset of items filtered from the database and loaded into the cache according to the corrected model.

15. The computer program product of claim 13, wherein the instructions for execution cause the processor to:
train the machine learning model which constructs a neural network that classifies discussion data from the social media history according to sales of goods represented by the items stored in the sales history and in the database.

16. The computer program product of claim 13, wherein the search comprises a data request received from a web server that generates a web page with at least one item of the subset of items.

17. The computer program product of claim 13, wherein the subset of items are represented in at least one cache object selected from a row in a relational database and a document in a non-relational database.

* * * * *